United States Patent [19]
Sauer et al.

[11] Patent Number: 5,792,298
[45] Date of Patent: Aug. 11, 1998

[54] METHOD OF MAKING A LAMINATED GLASS PANE WITH EMBEDDED ANTENNA WIRES

[75] Inventors: M. Gerd Sauer, Stolberg; M. Bernhard Reul, Aachen, both of Germany

[73] Assignee: Saint-Gobain Vitrage, Aubervilliers Cedex, France

[21] Appl. No.: 576,831

[22] Filed: Dec. 21, 1995

Related U.S. Application Data

[63] Continuation of Ser. No. 305,902, Sep. 14, 1994, abandoned.

[30] Foreign Application Priority Data

Sep. 23, 1993 [DE] Germany .................. 43 32 320.0

[51] Int. Cl.[6] .................................................. C03C 27/12
[52] U.S. Cl. ................................. 156/230; 156/106
[58] Field of Search ............................ 156/106, 230, 156/235, 247, 249, 273.9, 289, 298, 313; 219/203; 373/711, 712, 713, 872, 873

[56] References Cited

U.S. PATENT DOCUMENTS

| | | | |
|---|---|---|---|
| 3,431,384 | 3/1969 | Cooper | 219/68 |
| 3,615,986 | 10/1971 | Dickason et al. | 156/106 X |
| 3,740,281 | 6/1973 | Fujiwara | 156/106 X |
| 3,888,711 | 6/1975 | Breitner | 156/106 X |

*Primary Examiner*—Francis J. Lorin
*Attorney, Agent, or Firm*—Oblon, Spivak, McClelland, Maier & Neustadt, P.C.

[57] ABSTRACT

An automobile pane of laminated glass with a plurality of mutually parallel antenna wires having a diameter of 15 to 50 microns, which are virtually invisible to the eye. For producing such an antenna pane, the antenna wires are laid and fixed on a temporary support sheet, provided with an adhesive coating of the same thermoplastics polymer as the intermediate film of the laminated glass pane. By means of the temporary support sheet, the wires are transferred onto one of the two glass sheets forming the laminated glass pane. After removal of the temporary support sheet, the two glass sheets and the thermoplastics sheet forming the intermediate film are further processed in the usual manner to form the laminated glass pane

12 Claims, 4 Drawing Sheets

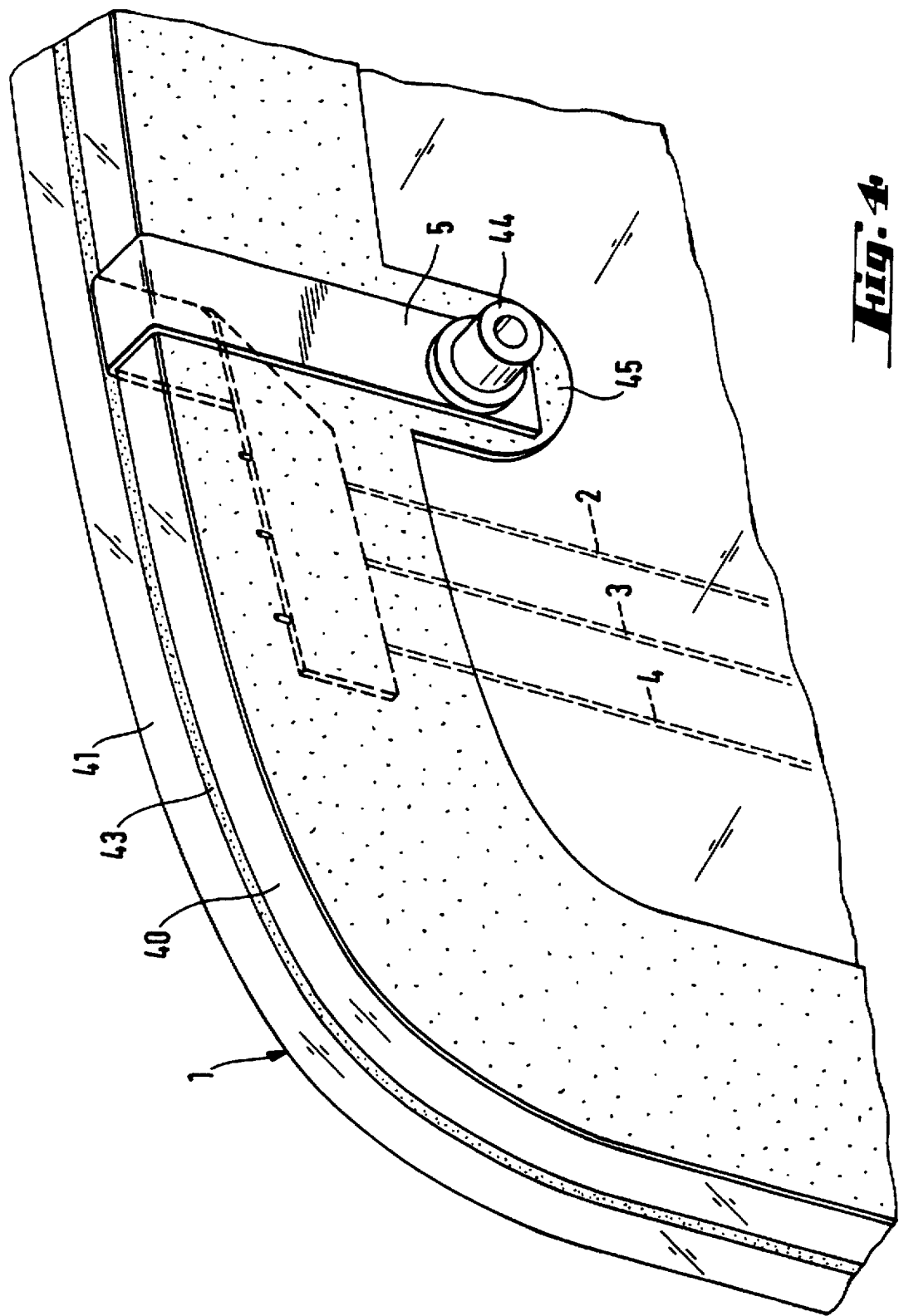

METHOD OF MAKING A LAMINATED GLASS PANE WITH EMBEDDED ANTENNA WIRES

This application is a continuation of application Ser. No. 08/305,902, filed on Sept. 14, 1994, now abandoned.

BACKGROUND OF THE INVENTION

1. Field of the Invention

This invention relates to a method of making a laminated glass pane having antenna wires disposed in a thermoplastic intermediate film.

2. Discussion of the Background

In known methods of producing a laminated glass pane having an antenna wire disposed in a thermoplastic intermediate film, the antenna wire is laid in a desired geometrical arrangement on the thermoplastic sheet that later forms the intermediate film, the sheet being softened by heating and the antenna wire being pressed into the softened Sheet. A method of this type is described, for example, in DE 20 43 706 C3.

Thermoplastics sheets, which find use as adhesive films for laminated glass panes and are generally formed of polyvinyl butyral, are very soft and flexible and, because of their low form stability, are difficult to handle. In handling these sheets for the purpose of making the laminated glass panes, the wire laid on the sheet can easily become detached from the sheet, so that the antenna wire moves away locally from the desired geometrical arrangement and in extreme cases breaks. The thinner the wires used, the more serious these difficulties become.

For the production of electrical heating panes of laminated glass having heating wires disposed in the thermoplastic intermediate film, a method is known from DE 14 96 040, in which the heating wires are fixed in a parallel arrangement on a frame, are laid with this frame directly on one of the two glass sheets intended for the laminated glass pane, and are secured in their position on the glass sheet by being sprinkled with a solution of the same material as that of the intermediate film, which after evaporation of the solvent forms a thin skin over the glass and the wires. This method is not suitable for the production of laminated glass panes having an embedded antenna wire.

From DE 30 01 554, a method of laying thin wires in the intermediate film of laminated glass is known, in which the wire is wound helically around a plastic filament of the same basic material as the intermediate film and the filament thus wound with the wire is pressed into the intermediate film. If several wires are to be arranged parallel to one another in this manner, the corresponding number of wrapped-around plastic filaments must be tensioned above the thermoplastic intermediate film. On the one hand, it is difficult to assure a uniform geometrical arrangement of the wires. On the other hand, there is a risk that, in the subsequent necessary handling of the soft intermediate film and in the frequently observed shrinkage phenomena of the intermediate film, this film will deform, with the result that the arrangement of the wire or wires can depart from the desired pattern. Finally, it is not possible with this method to arrange the wires strictly rectilinearly, because they are always in a three-dimensional, helically wound form.

The object of the present invention is to create a method of making a laminated glass pane having one or more very thin antenna wires disposed in the intermediate film, for reducing or eliminating the risk of a deformation or destruction of the antenna wires during the further processing of the laminated glass pane, which can be easily integrated into the usual production process for laminated glass panes and which is especially suitable for the production of laminated glass panes having extremely thin and therefore largely invisible antenna wires.

According to the invention, the antenna wire or wires are laid in the desired geometrical arrangement on a temporary support sheet provided with an adhesive film of the same thermoplastic polymer as the intermediate film of the laminated glass pane and are fixed by the application of heat and pressure, are transferred using the temporary support sheet onto one of the glass sheets constituting the laminated glass pane and, after removal of the temporary support sheet, the glass sheet and the intermediate film are further processed in the usual manner to form the laminated glass pane.

According to the invention, the process step in which the thin wires are to be processed and laid in the desired geometrical arrangement is completely separate from the process steps that are necessary for the production of the laminated glass pane. They may, for example, be carried out in an environment especially suitable for this purpose with special equipment, which are not suitable for applications in manufacturing works for laminated glass panes. In this way, high accuracy can be achieved with regard to the geometrical arrangement of the wires on the temporary support sheet, which also remains unchanged after the transfer onto the glass sheet because the wires including the adhesive film are transferred onto the rigid glass sheet and simultaneously are fixed thereto using the thermoplastic adhesive film, so that subsequent deformation is prevented. On the other hand, the handling of the temporary support sheet in the manufacturing works for the laminated glass panes is considerably simpler than the handling of the wires themselves, so that the method as a whole leads to a better result and can be more easily accommodated into the production process of laminated glass panes.

The method according to this invention is particularly suitable when a plurality of extremely thin wires of only 15 to 50 µm diameter are to be embedded in a parallel arrangement and a rectilinear alignment into the laminated glass pane. Whereas, in the conventional methods, it is difficult to connect thin wires of this type within the laminated glass pane to a metal foil strip which is led out of the laminated glass pane to a terminal element, with the method according to this invention, the metal foil strip can be connected in a much simpler manner to the wires before being placed on the glass sheet. Also, the displacement of this process step out of the actual laminated glass manufacture into the preceding manufacturing step of prefabricating the antenna component contributes considerably to simplifying the manufacturing process of the actual laminated glass pane.

The method according to this invention can, for example, be carried out such that the antenna wires, laid on the temporary support sheet provided with the thermoplastic adhesive film, are pressed onto and into this film by means of a heated pressing roller and are fixed. According to another embodiment of the invention, the laying and fixing of the antenna wires on the temporary support sheet coated with the thermoplastic adhesive are carried out so that the wires are tensioned above the temporary support sheet, and before being pressed into the thermoplastic adhesive film, are heated by the application of an electrical voltage. The method can be carried out in such a way that, with the wires tensioned before the application of the wires onto the temporary support sheet, metal foil strips are first permanently electrically connected by friction welding to the wires at preselected spacings, and these metal foil strips, which serve as antenna terminal lugs in the laminated glass pane, are utilized in the contacting of the wires for the application of the electrical voltage for heating the wires during the embedding into the thermoplastic adhesive film of the temporary support sheet.

Further details and advantages of the invention will be apparent from the claims and from the following description of the preferred embodiments of the invention.

BRIEF DESCRIPTION OF THE DRAWINGS

FIG. 4 is an enlarged partial view of a windshield in the region of the antenna terminal connection.

DETAILED DESCRIPTION OF THE PREFERRED EMBODIMENTS

Figure 1:
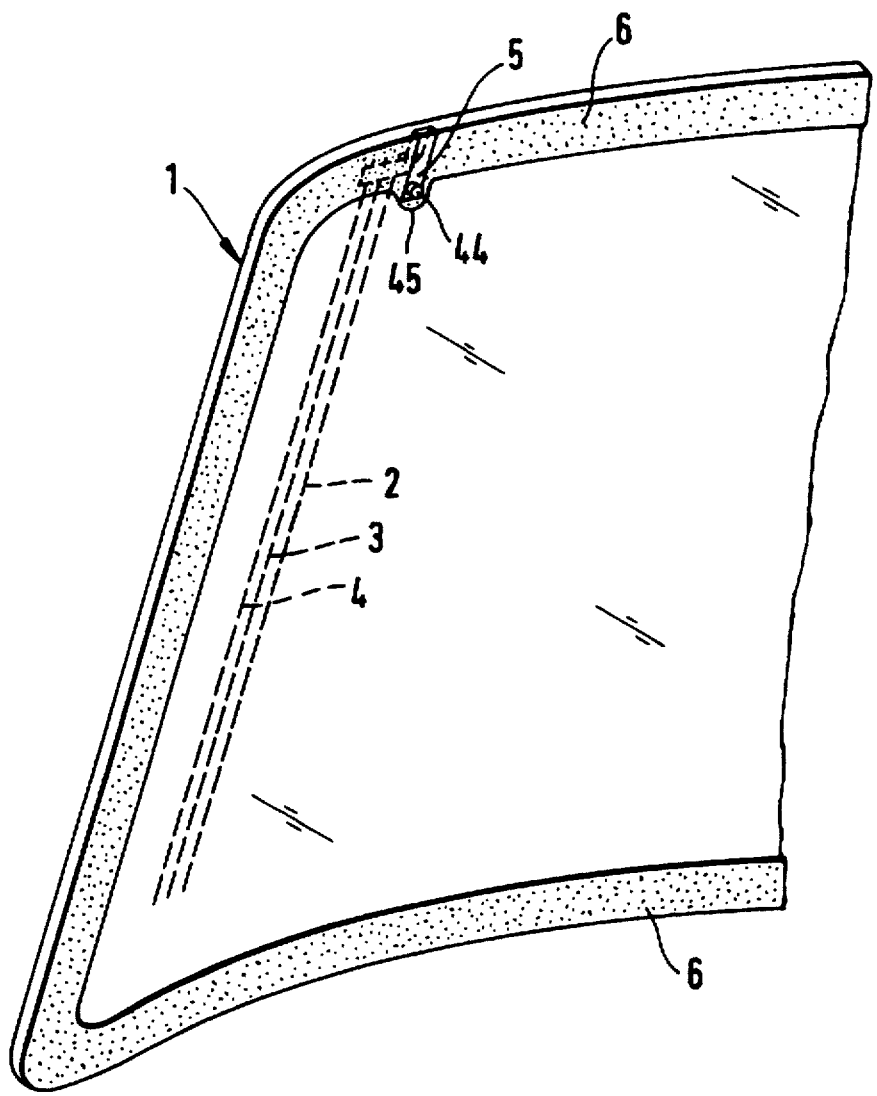
FIG. 1 illustrates a partial view of a windshield with a fine wire antenna according to this invention.

FIG. 1 shows a lateral portion of a windshield 1 of laminated glass in a view from the side nearest the passenger compartment, the windshield being provided with three rectilinear, mutually parallel antenna/conductors 2, 3 and 4. These antenna conductors 2, 3 and 4 are situated between the two glass sheets forming the laminated glass pane, i.e., within the thermoplastic intermediate film bonding these glass sheets together. The three antenna conductors 2, 3 and 4 consist of very thin tungsten wires having a diameter of about 20 microns and have a mutual spacing of about 2 to 5 mm. Since the antenna wires are extremely thin and also are blackened at their surface, they are virtually invisible to the eye, without the power of the antenna being thereby adversely affected.

The antenna wires 2, 3 and 4 are electrically conductively connected at one end to a metal foil strip 5. The metal foil strip 5 is folded at an angle of 45° and is led out of the peripheral surface of the laminated glass pane. Along the edge, the windshield 1 is provided, for example on the side towards the passenger compartment, with a decorative frame 6 of a baking finish, which in the installed state conceals the bonding adhesive from view and at the same time protects the bonding adhesive from UV radiation. The antenna wires 2, 3 and 4 run essentially parallel to the lateral edge of the windshield.

The three antenna wires 2, 3 and 4 and the metal foil strip 5 connected to them are applied, in the form of a prefabricated component before the laminated glass pane is manufactured, by means of a temporary support sheet onto a surface of one of the two glass sheets against which the thermoplastic intermediate film is to be placed.

Figure 2:
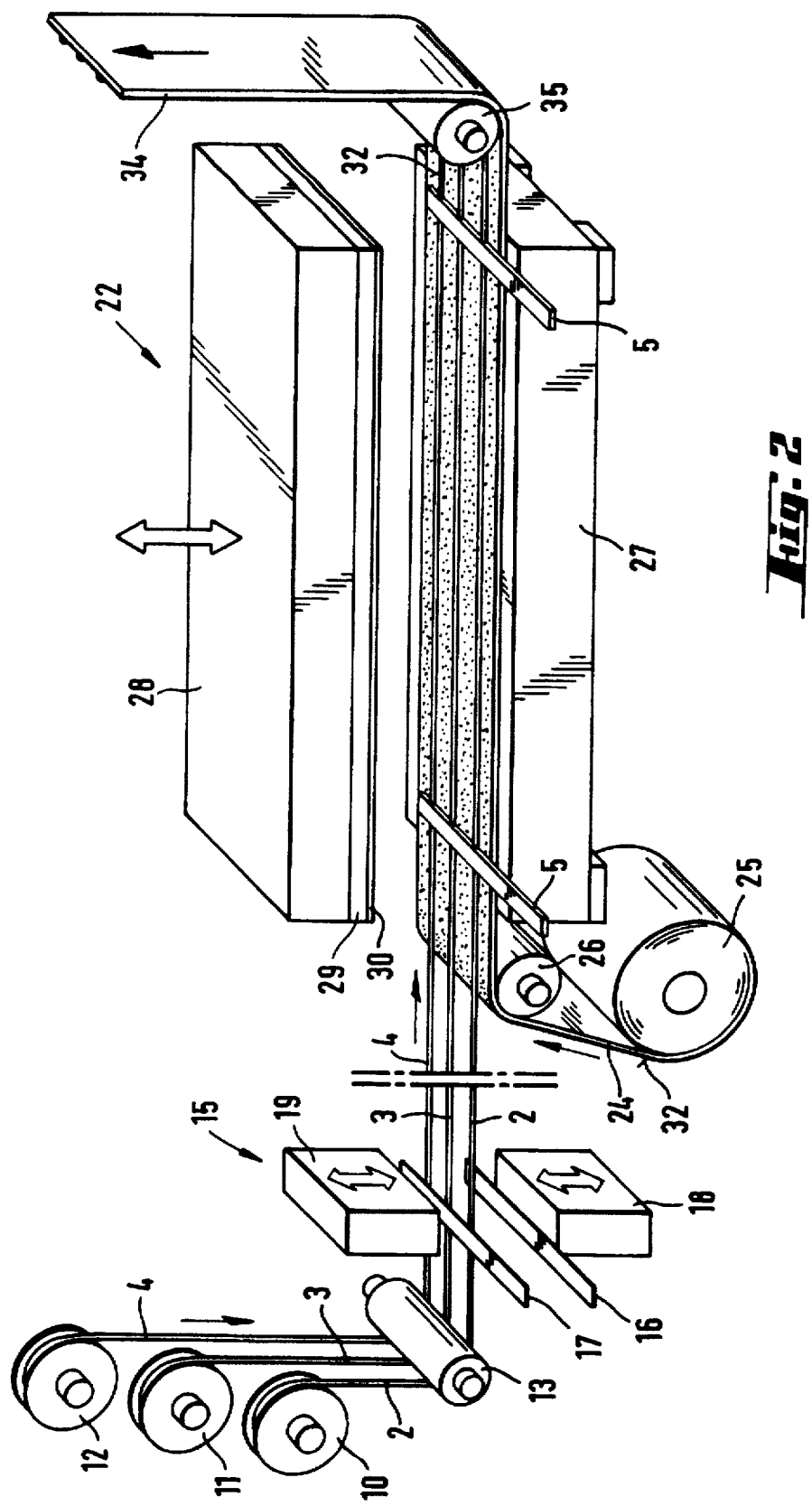
FIG. 2 shows a device for producing prefabricated antenna configurations on a temporary support sheet.

The production of the prefabricated antenna components is performed by means of the device illustrated in FIG. 2. This device comprises a suitable bearing apparatus for three wire coils 10, 11 and 12, from which the wires 2, 3 and 4 are unraveled and are deflected over a deflecting roller 13 into the horizontal direction. The horizontally tensioned wires initially pass through a friction welding station 15, in which, at predetermined intervals, they are each embedded between two metal foil strips 16, 17, oriented transversely to the direction of the wires, and are welded to these strips. For this purpose, the metal foils 16, 17 with the wires 2, 3 and 4 lying between them are pressed between two metal jaws 18, 19, one of which is set in ultrasonic vibration by coupling to a suitable ultrasonic transmitter. By this friction welding process, the tungsten wires are embedded in the copper and a very good electrical transmission is obtained.

Instead of two metal foil strips 16, 17, prepared conducting strips, which have already been provided with a sheath of a tear-resistant plastic material, may be advantageously used, where only the metal tongues of these conductors, which are to be welded to the wires, are exposed. The tongue is preferably folded over, so that the folded portion of the conducting strip encloses the wires before the friction welding operation is carried out.

The wires, equipped with the terminal lugs 5 at predetermined intervals, are then fixed in a pressing station 22 onto a temporary support sheet 24. The temporary support sheet 24 is unraveled as an endless band from a storage roll 25, journalled beneath the transporting plane for the wires, and is fed around a change-direction roll 26 to the actual pressing station 22, which comprises a table 27 and an upper pressing plate 28. The upper pressing plate 28 is provided, on its lower face, with an elastically resilient buffer layer 29, which in turn is provided on its lower face with a separating foil 30, which prevents the pressing plate from sticking to the surface of the support sheet 24.

The temporary support sheet 24 is provided, on its upper surface, with a thin coating 32 of the same thermoplastic adhesive material as that from which the thermoplastic intermediate film of the laminated glass pane is made. A suitable parting agent coating directly on the temporary support sheet 24, that is beneath the layer 32, prevents an overly strong bond of the layer 32 to the temporary support sheet 24.

As soon as a portion of the wires lying between two terminal lugs 5 is positioned inside the pressing station 22, the conveyance of the wires and the temporary support sheet 24 is interrupted. A suitable electrical voltage is then applied to the two terminal lugs 5 lying at the front and rear ends of the pressing station 22, where the voltage is sufficient for heating the wires between the two terminal lugs to a temperature of about 80° to 150° Celsius. The pressing plate 28 is then lowered onto the table 27. The wires 2, 3 and 4 are thereby embedded in the thermoplastic layer 32, while at the same time the current supply to the terminal lugs 5 is cut off. The pressing plate 28 is then raised, so that the temporary support sheet 24, now provided with the wires 2, 3 and 4 and with the terminal lugs 5, can be incrementally conveyed around a change direction roller 35.

While the adhesive fixing of the wires to the temporary support sheet 24 occurs in the pressing station 22, the production of the terminal lugs 5 for the next wire portion is simultaneously carried out in the friction welding station 15.

Figure 3:
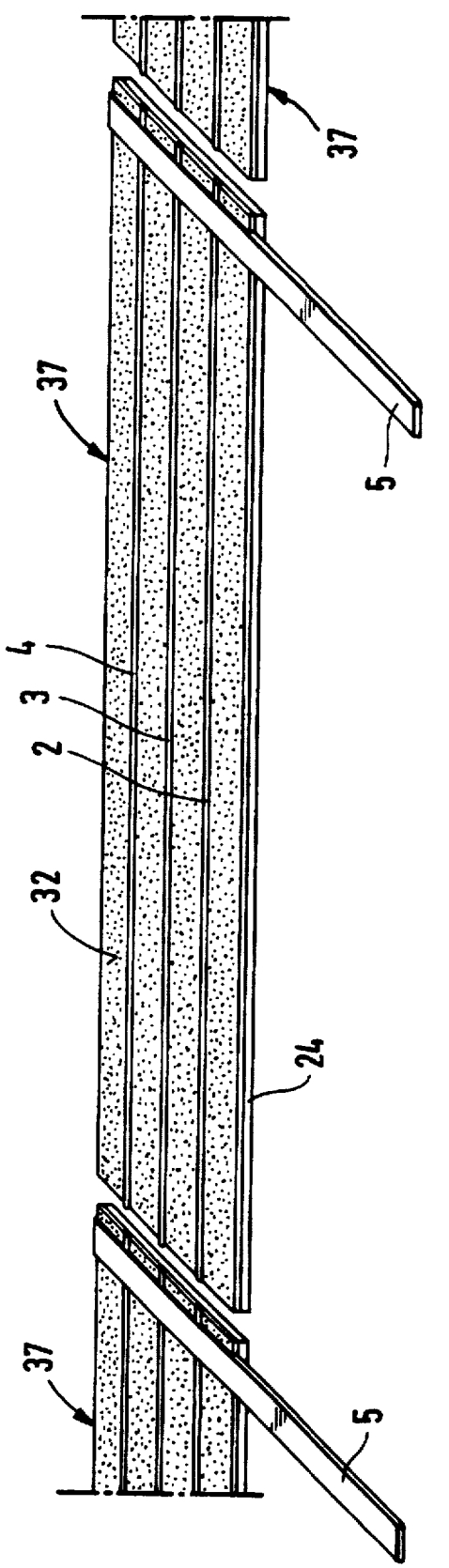
FIG. 3 shows prefabricated antenna conductors on a temporary support sheet after the separation from the continuously produced temporary support band.

As shown in FIG. 3, the endless band 34 produced in this manner is then divided adjacent to each terminal lug 5 into individual portions 37, each constituting a prefabricated antenna component, which is immediately suitable for laying and fixing of the wires 2, 3 and 4 on a glass sheet.

In a preferred embodiment, the subdividing of the endless band into individual portions 37 is carried out in two steps, namely a first step in which the metal wires are cut, and a second step in which the temporary support sheet is cut through or, for example, is sufficiently weakened by perforations to allow the portion 37 to be later separated manually. For cutting the wires, which in particular consist of comparatively hard tungsten, which causes the cutting edges of cutting tools to become rapidly blunt, an electrical cutting method can be used in which an electrical current is introduced into the wires through two electrodes disposed a short distance apart, thus causing the portion of wire between the electrodes to melt. At this position, the cutting-through or perforating of the temporary support sheet can then be performed in the second step by means of a cutting or punching tool.

For the production of the laminated glass pane 1, a portion of which is illustrated in the region of the antenna terminal in FIG. 4, the procedure is as follows: first of all, the two single glass sheets 40 and 41, after they have been jointly bent, are carefully cleaned in a conventional manner.

The glass sheet 40 has been provided, on its face towards the passenger compartment, with a decorative frame 6 at the edge, which was baked during the bending operation. On this glass sheet 40, on the surface intended for contact with the intermediate film 43, a prefabricated antenna component 37 is laid parallel to the lateral edge of the glass sheet in such a way that the terminal lug 5 lies in the upper edge zone of the glass sheet. The terminal lug 5 extends initially perpendicularly to the antenna wires, that is to say generally parallel to the upper edge of the glass sheet. The temporary support sheet 24 is then heated, by means of a heated pressure roller, for example, which is guided over the temporary support sheet. Due to the effect of the heat and pressure the thermoplastic adhesive coating 32 softens and, together with the antenna wires 2, 3, 4, bonds to the surface of the glass sheet 40. The temporary support sheet 24 is then now pulled off the glass surface.

The procedure may, however, also be that initially the glass sheet 40, on which the antenna wires are to be fixed, is heated, before the antenna component 37 is applied, to the temperature necessary for softening the thermoplastic adhesive coating 32, and then the antenna component 37 is laid at the intended position on the glass sheet 40 and applied thereto. In this case, the heat necessary for softening the adhesive coating is supplied by direct contact with the hot glass surface and does not need to be supplied, as in the first described case, through the temporary support sheet. Immediately after the application of the antenna component 37, the temporary support sheet 24 can be pulled off the glass surface.

The terminal lug 5 is initially extended over its entire length so as to be perpendicular to the antenna wires. It is then folded directly adjacent to the antenna wires in such a manner that it forms, for example, a right angle with respect to the portion connected to the wires, so that the terminal lug projects beyond the edge of the glass sheet 40. The glass sheet 40 is then placed together with the thermoplastic sheet constituting the intermediate film 43 and the glass sheet 41, and the layered assembly is bonded in a conventional manner by the application of heat and pressure to form the finished laminated glass pane.

In the last process step, the portion of the terminal lug 5 projecting out of the edge of the laminated glass pane is bent around the peripheral surface of the glass sheet 40 and bonded to the peripheral surface of the glass sheet 40 and to the edge region carrying the decorative coating 6. At the end of the terminal lug 5, a terminal element 44 can, for example, already have been soldered to the terminal lug 5. Preferably, the bonding of the terminal lug 5 including the antenna terminal element 44 occurs in the region of the decorative frame 6 which for this purpose can be provided if necessary with an additional bulge 45.

Since the terminal lug 5 is partly visible from the outer side of the laminated glass pane, it may be desirable to provide the glass sheet 41, in this region, with a suitable paint adapted to the paint of the decorative coating 6, or to color the terminal lug 5 itself accordingly.

What is claimed as new and desired to be secured by Letters Patent of the United States is:

1. A method for manufacturing a laminated glass pane having at least one antenna wire disposed in an intermediate thermoplastic film, comprising the steps of:

forming a temporary support sheet;

providing an adhesive coating on a major surface of said temporary support sheet;

directly connecting said at least one antenna wire to a terminal lug;

placing said at least one antenna wire and said directly connected terminal lug in a desired geometrical arrangement on said adhesive coating provided on said temporary support sheet;

fixing said at least one antenna wire and said terminal lug to said adhesive coating by the application of heat and pressure to form an antenna component having a single support sheet on one side of said antenna wire with an opposite side of said antenna wire being uncovered;

fixing said opposite side of said antenna wire of said antenna component to a first glass sheet;

removing said temporary support sheet from said adhesive coating, thereby leaving said adhesive coating and said at least one antenna wire fixed to said first glass sheet; and fixing a second glass sheet to said adhesive coating opposite to said first glass sheet.

2. The method according to claim 1, wherein said fixing step comprises:

fixing said at least one antenna wire to said adhesive coating by means of a heated pressing roller.

3. The method according to claim 1, wherein said placing step comprises aligning said at least one antenna wire above said temporary support sheet.

4. The method according to claim 1, wherein said fixing step comprises:

applying an electrical voltage to the ends of said at least one antenna wire; and pressing said wire into said adhesive coating.

5. The method according to claim 4, wherein said step of applying said electrical voltage comprises directly contacting said wire using change-direction and holding rollers.

6. The method according to claim 1, wherein said connecting step comprises welding the terminal lugs to said antenna wire by friction welding, using a tool set in ultrasonic vibration.

7. The method according to any one of claims 1–5, wherein said fixing step comprises fixing a plurality of antenna wires each with a diameter of 15 to 100 μm.

8. The method according to claim 7, wherein said fixing step comprises fixing said plurality of antenna wires simultaneously at a spacing of 2 to 5 mm on said temporary support sheet.

9. The method according to any one of claims 1–5, further comprising the step of blackening said antenna wire at the surface thereof.

10. The method according to any one of claims 1–5, wherein said placing step comprises placing and fixing at least one antenna wire of indefinite length on an temporary support sheet of indefinite length from which individual portions are cut for the purpose of forming prefabricated antenna components, said at least one antenna wire being cut by electrical energy and said temporary support sheet being partly or completely cut by a mechanical punching or cutting tool.

11. The method according to any one of claims 1-5, wherein said fixing step comprises preheating said first glass sheet to a temperature sufficient for softening the thermoplatic adhesive coating.

12. A method for manufacturing a laminated glass pane having at least one metal wire disposed in an intermediate thermoplastic film, comprising the steps of:

forming a temporary support sheet;

providing an adhesive coating on a major surface of said temporary support sheet;

directly connecting said at least one metal wire to a terminal lug;

placing said at least one metal wire and said directly connected terminal lug in a desired geometrical arrangement on said adhesive coating provided on said temporary support sheet;

fixing said at least one metal wire and said terminal lug to said adhesive coating by the application of heat and pressure to form an wire assembly having a single support sheet on one side of said metal wire with an opposite side of said metal wire being uncovered;

fixing said opposite side of said metal wire of said wire assembly to a first glass sheet;

removing said temporary support sheet from said adhesive coating, thereby leaving said adhesive coating and said at least one metal wire fixed to said first glass sheet; and fixing a second glass sheet to said adhesive coating opposite to said first glass sheet.

* * * * *